(12) United States Patent
Kato et al.

(10) Patent No.: US 11,073,073 B2
(45) Date of Patent: Jul. 27, 2021

(54) FLOW-PATH STRUCTURE

(71) Applicant: CALSONIC KANSEI CORPORATION, Saitama (JP)

(72) Inventors: Masahiro Kato, Saitama (JP); Kyouhei Takimoto, Saitama (JP); Takashi Kaneda, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 291 days.

(21) Appl. No.: 16/086,006

(22) PCT Filed: Mar. 23, 2017

(86) PCT No.: PCT/JP2017/011616
§ 371 (c)(1),
(2) Date: Sep. 17, 2018

(87) PCT Pub. No.: WO2017/164273
PCT Pub. Date: Sep. 28, 2017

(65) Prior Publication Data
US 2020/0332706 A1    Oct. 22, 2020

(30) Foreign Application Priority Data
Mar. 23, 2016    (JP) .............................. JP2016-058863

(51) Int. Cl.
*F02B 29/04*    (2006.01)
*F28D 7/16*    (2006.01)
(Continued)

(52) U.S. Cl.
CPC ................ *F02B 29/04* (2013.01); *F28D 7/16* (2013.01); *F28D 7/1653* (2013.01); *F28F 9/00* (2013.01);
(Continued)

(58) Field of Classification Search
CPC .......... F02B 29/04; F28D 7/16; F28D 7/1653; F28F 9/00; F28F 9/18; F28F 9/0219; F28F 9/0226
(Continued)

(56) References Cited

U.S. PATENT DOCUMENTS

2011/0168364 A1    7/2011    Okuyama et al.
2012/0118543 A1    5/2012    Ninagawa et al.
(Continued)

FOREIGN PATENT DOCUMENTS

JP    S60-170587 U    11/1985
JP    2011-144974 A1    7/2011
(Continued)

*Primary Examiner* — Mahmoud Gimie
(74) *Attorney, Agent, or Firm* — Foley & Lardner LLP (57) ABSTRACT

A flow-path structure through which fluid flows includes: a barrel body through which fluid flows in an inner circumference; and a frame body configured to connect a flow path member, the flow path member being configured to guide the fluid into the barrel body, wherein the frame body has: a ring-shaped frame part configured to be fitted into an outer surface of the barrel body; and an inner engagement portion configured to engage with an inner surface of the barrel body so as to hold a state in which the outer surface of the barrel body is brought into contact with the frame part.

3 Claims, 8 Drawing Sheets

(51) Int. Cl.
*F28F 9/18* (2006.01)
*F28F 9/00* (2006.01)
*F28F 9/02* (2006.01)

(52) U.S. Cl.
CPC .......... *F28F 9/0219* (2013.01); *F28F 9/0226* (2013.01); *F28F 9/18* (2013.01)

(58) Field of Classification Search
USPC ......................................................... 123/542
See application file for complete search history.

(56) References Cited

U.S. PATENT DOCUMENTS

| | | |
|---|---|---|
| 2013/0146267 A1 | 6/2013 | Garret et al. |
| 2013/0192803 A1* | 8/2013 | Garret .................. F28F 9/0226 165/151 |
| 2017/0184060 A1* | 6/2017 | Oho ....................... F02M 26/32 |
| 2019/0120561 A1* | 4/2019 | Suzuki ...................... F28F 9/02 |
| 2019/0331067 A1* | 10/2019 | Yamada .............. F28D 21/0003 |

FOREIGN PATENT DOCUMENTS

| | | |
|---|---|---|
| JP | 2012-107808 A | 6/2012 |
| JP | 2013-514514 A | 4/2013 |
| JP | 2014-214955 A1 | 11/2014 |

* cited by examiner

FLOW-PATH STRUCTURE

CROSS-REFERENCE TO RELATED APPLICATIONS

This application is a National Phase of International Patent Application No. PCT/JP2017/011616, filed Mar. 23, 2017, which claims priority to Japanese Patent Application No. 2016-058863, filed Mar. 23, 2016. The contents of these applications are herein incorporated by reference in their entirety.

TECHNICAL FIELD

The present invention relates to a flow-path structure through which fluid flows.

BACKGROUND ART

JP2014-214955A discloses a heat exchanger that is used as an intercooler of an engine.

The above-mentioned heat exchanger includes a core unit through which cooling fluid circulates, an air-intake-flow-path forming member that accommodates the core unit, and frame-shaped connecting plates that connect a duct to the air-intake-flow-path forming member. The intake air for the engine flows through the air-intake-flow-path forming member via the duct and is cooled by releasing the heat to the cooling fluid circulating in the core unit.

When the above-mentioned heat exchanger is fabricated, an assembled body is formed by assembling the core unit, the air-intake-flow-path forming member, and the connecting plates. The assembled body is heated in a heating furnace, and thereby, the respective members are brazed to each other.

Since frame shaped connecting plates are fitted into the outer circumference of the air-intake-flow-path forming member, the frame-shaped connecting plates restrict outwards deformation of the air-intake-flow-path forming member when the brazing is performed.

SUMMARY OF INVENTION

With the heat exchanger disclosed in JP2014-214955A, the frame-shaped connecting plates do not have parts that engage with the inner circumference of the air-intake-flow-path forming member. Therefore, an assembling error in which the air-intake-flow-path forming member is separated inwards from the connecting plates when the assembled body is subjected to the brazing, may cause a gap between them.

An object of the present invention is to prevent occurrence of an assembling error for a flow-path structure.

According to one aspect of the present invention, a flow-path structure through which fluid flows, the flow-path structure includes: a barrel body through which fluid flows in an inner circumference; and a frame body configured to connect a flow path member, the flow path member being configured to guide the fluid into the barrel body, wherein the frame body has: a ring-shaped frame part configured to be fitted into an outer surface of the barrel body; and an inner engagement portion configured to engage with an inner surface of the barrel body so as to hold a state in which the outer surface of the barrel body is brought into contact with the frame part.

In the above-described aspect, the ring-shaped frame part of the frame body is fitted to the outer surface of the barrel body, and thereby, deformation of the barrel body towards outside is restricted. The inner engagement portion of the frame body engages with the inner surface of the barrel body, and thereby, separation of the barrel body from the frame part is restricted. With such a configuration, the frame part and the outer surface of the barrel body can be assembled without forming a gap, and therefore, it is possible to prevent occurrence of an assembling error of the flow-path structure.

DESCRIPTION OF EMBODIMENTS

An embodiment of the present invention will be described below with reference to the attached drawings.

Figure 1:
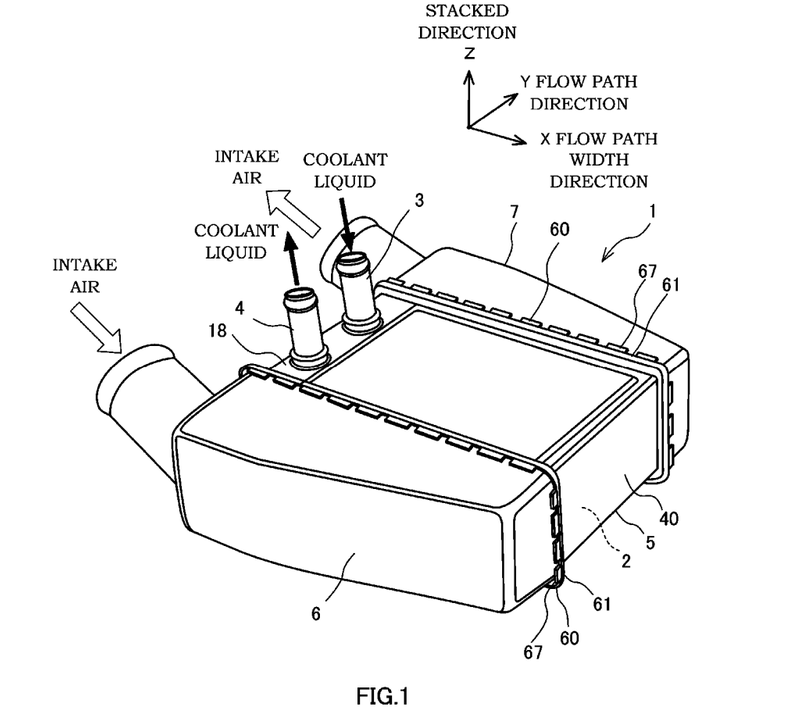
FIG. 1 is a perspective view showing a heat exchanger according to an embodiment of the present invention.

A heat exchanger 1 shown in FIG. 1 is used as a fluid-cooled charge air cooler for cooling intake air to be supercharged to an engine (not shown) with coolant liquid (coolant medium).

Figure 2:
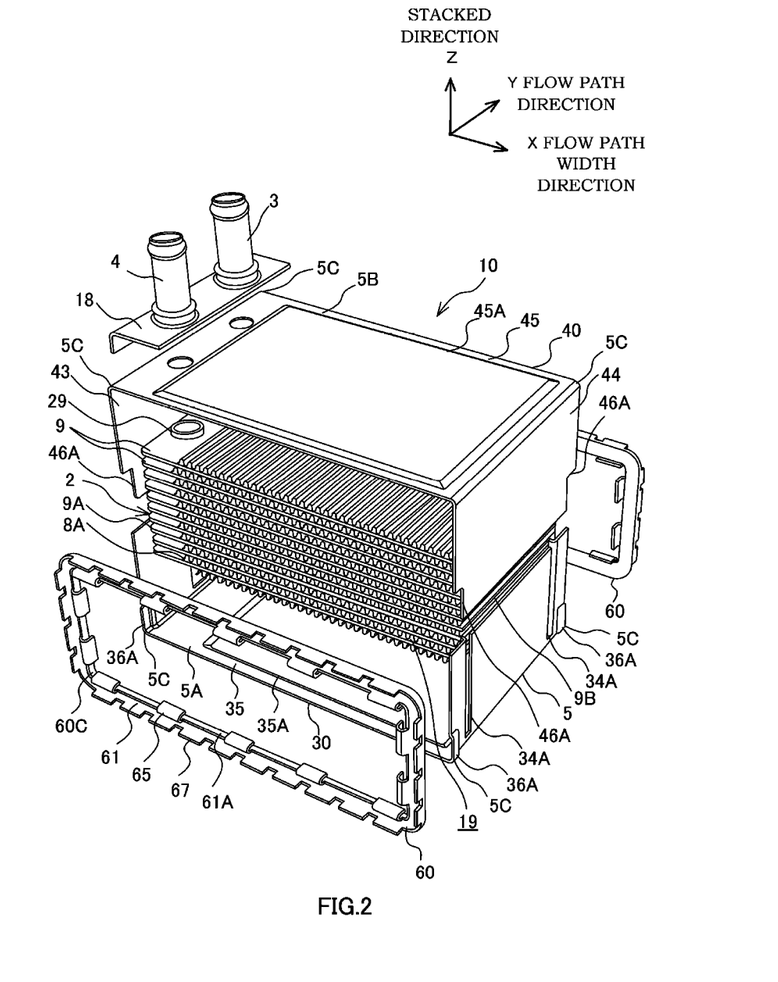
FIG. 2 is a perspective view showing an assembled body of the heat exchanger in a state being disassembled.

The heat exchanger 1 includes a barrel-shaped barrel body 5 having pipes 3 and 4 projecting out therefrom, a pair of ducts 6 and 7 connected to both opening ends of the barrel body 5, and a core 2 accommodated within the barrel body 5 (see FIG. 2).

The barrel body 5 and the ducts 6 and 7 form a flow-path structure through which the intake air (fluid) flows.

Air intake pipes (not shown) for the engine are connected to the ducts 6 and 7. When the engine is operated, the intake air flows through the air intake pipe and flows into the core 2 from the one duct 6 via the barrel body 5. The intake air flowing through the core 2 is cooled by releasing heat to the coolant liquid flowing within the core 2. With such a configuration, the intake air that has been cooled in the heat exchanger 1 is then sucked into the engine from the other duct 7 through the air intake pipe.

A piping (not shown) through which the coolant liquid circulates is connected to the pipes 3 and 4 that are connected to the core 2. When the engine is operated, the coolant liquid that has been sent from a pump (not shown) through the piping flows into the inside of the core 2 through the one pipe 3. The coolant liquid that has been subjected to heat exchange by flowing through the inside of the core 2 flows out from the other pipe 4. With such a configuration, the coolant liquid that has flowed out from the heat exchanger 1 is guided to a radiator (not shown) through the piping. After releasing the heat to outside air at the radiator, the coolant liquid is sucked into a pump and is circulated.

Next, the core 2 will be described. The core 2 is provided as treating means for cooling the intake air (fluid).

As shown in FIG. 2, the core 2 includes a plurality of tubes 9 that are stacked and fins 8 that are interposed between the respective tubes 9. Flow paths 19 (heat exchange flow paths) for guiding the intake air are formed between the tubes 9 and the fins 8. By providing the fins 8, the surface area of the core 2 is increased. The configuration of the core 2 is not limited to that including the fins 8, and the core 2 may have the configuration in which only the tubes 9 are stacked with interposed spaces.

In the following, the respective figures are described by setting three mutually orthogonal axes X, Y, and Z. In the core 2, the X axis direction in which the tubes 9 extend is called "the flow path width direction", the Y axis direction in which the intake air flows in the flow paths 19 is called "the flow path direction", and the Z axis direction in which the tubes 9 are aligned is called "the stacked direction".

Figure 3:
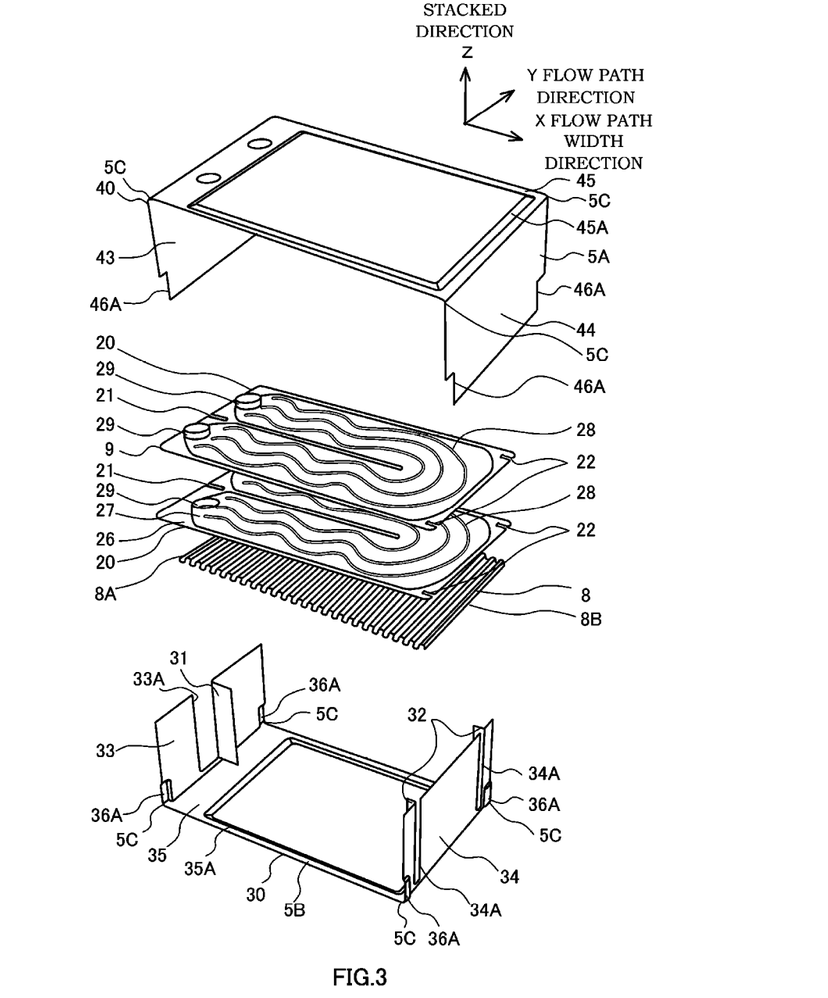
FIG. 3 is a perspective view showing a barrel body and a core in a state being disassembled.
Figure 4:
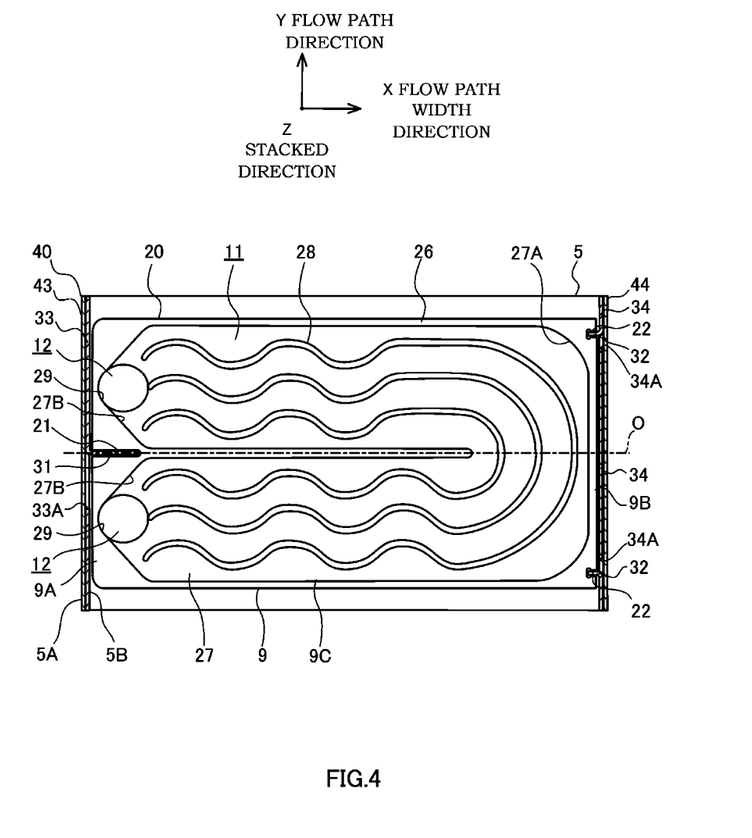
FIG. 4 is a sectional view showing the barrel body and the core.

As shown in FIGS. 3 and 4, the tubes 9 are each a flat flow path members extending in the flow path width direction (the X axis direction) and in the flow path direction (the Y axis direction). The tube 9 includes a tube heat transfer portion 9C for transferring heat between first fluid and second fluid and tube end portions 9A and 9B that extend along an inner surface 5B of the barrel body 5 in the flow path direction (the Y axis direction). The tube 9 is formed by joining two tray-shaped tube sheets 20.

The tube sheet 20 has a flow path wall 27 that forms tube inner flow paths 11, two annular burrings 29 that project out from the flow path wall 27, and a flange 26 that is joined so as to surround the flow path wall 27.

The flange 26 is formed so as to be symmetrical about the center line O of the tube 9 extending in the flow path width direction (the X axis direction). The two tube sheets 20 forming one tube 9 are joined so as to face each other. The tube end portions 9A and 9B are formed by two flanges 26 that are joined to each other.

The flow path wall 27 has a plurality of (three) beads 28 that extend in U shape, two tank wall portions 27B at which the burrings 29 are opened, and a turning wall portion 27A that allows the coolant liquid to flow so as to return in a parallel flow. The beads 28 extends from the vicinity of one of the tank wall portions 27B to the vicinity of other of the tank wall portions 27B. The tube heat transfer portion 9C is formed by the two flow path walls 27 facing each other.

The burrings 29 provided in the respective adjacent tubes 9 are connected to each other so as to form supply/discharge flow paths 12 (tank flow paths) through which the coolant liquid flows.

As shown in FIG. 2, the pipes 3 and 4 are joined on the upper end of the barrel body 5 via a pipe plate 18. The pipes 3 and 4 are respectively connected to the two burrings 29 provided on top portions.

The coolant liquid that has entered the inside of the core 2 through the pipe 3 is distributed to the respective tube inner flow paths 11 from one of the supply/discharge flow paths 12. The coolant liquid undergoes the heat exchange by flowing in the tube inner flow paths 11 along the flow path width direction (the X axis direction) so as to form the returning parallel flow, and thereafter, the coolant liquid converges at the other supply/discharge flow paths 12 and flows out through the pipe 4.

The flow paths 19 extending in the Y axis direction are formed between the colgated fins 8 and the tubes 9. The fins 8 having a rectangular shape have fin side-ends 8A and 8B that extend in the flow path direction (the Y axis direction).

Figure 5:
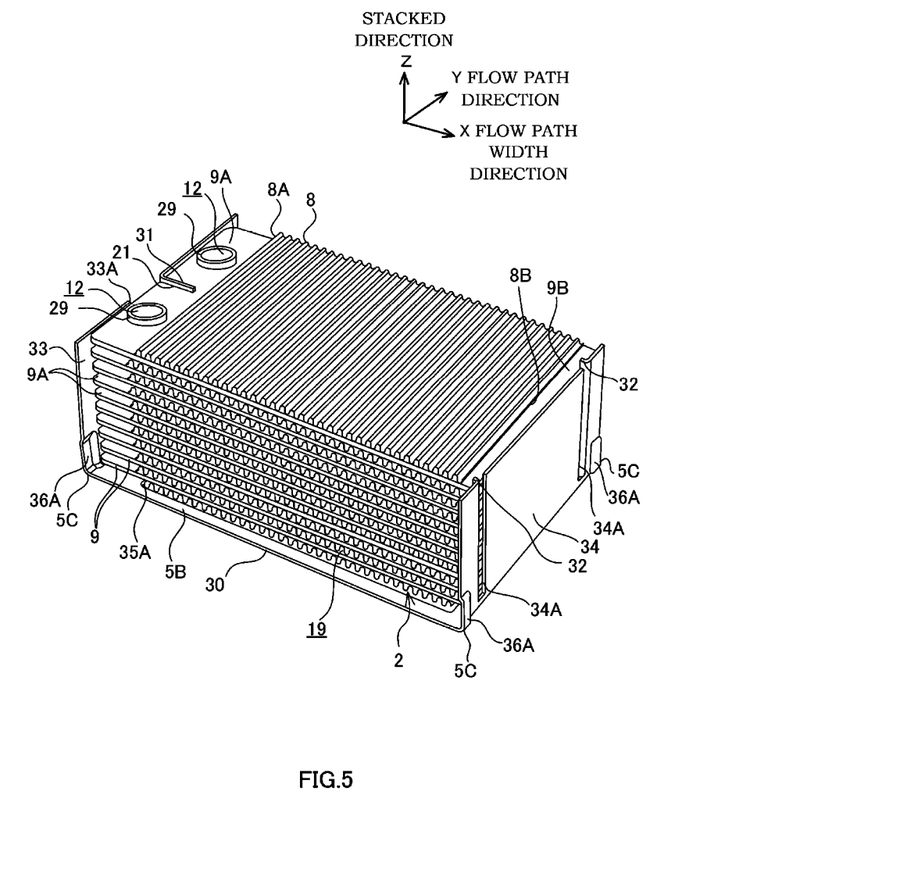
FIG. 5 is a perspective view showing the barrel body and the core.
Figure 6:
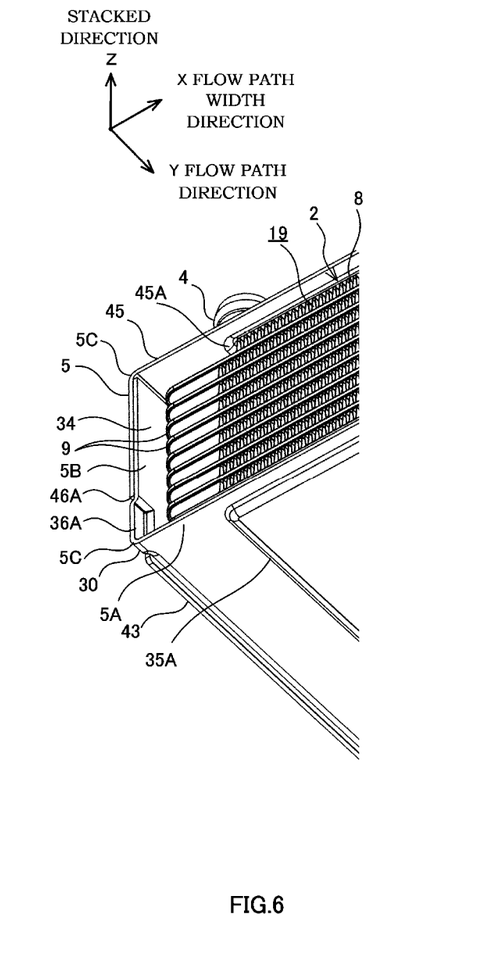
FIG. 6 is a perspective view showing the core.

As shown in FIG. 5, the tubes 9 having a rectangular shape have the tube end portions 9A and 9B that project out in the flow path width direction (the X axis direction) with respect to both fin side-ends 8A and 8B of the fins 8 and that extend in the flow path direction (the Y axis direction) (see FIG. 5).

The heat exchanger 1 includes a positioning structure that allows positioning of the tubes 9 with respect to the barrel body 5 when the tubes 9 are assembled to the barrel body 5.

As shown in FIG. 4, the positioning structure includes slits 21 and 22 that respectively open at the tube end portions 9A and 9B and ribs 31 and 32 that project out from the barrel body 5 so as to be respectively inserted into the slits 21 and 22.

The slit 21 opens at the tube end portion 9A and is formed to have a slit shape extending in the flow path width direction (the X axis direction). The slit 21 is arranged between the two tank wall portions 27B and is formed so as to extend on the center line O of the tubes 9.

The two slits 22 open at the tube end portion 9B and are formed to have the slit shape extending in the flow path width direction (the X axis direction). The two slits 22 are respectively arranged on both corner portions of the tube end portion 9B such that the turning wall portion 27A is arranged therebetween.

As the configuration described above, the slits 21 and 22 are respectively formed in the tube end portions 9A and 9B so as to avoid the tube inner flow paths 11.

Next, the flow-path structure forming the heat exchanger 1 will be described. The flow-path structure includes the barrel body 5 and frame bodies 60.

As shown in FIG. 3, the barrel body 5 having a barrel shape includes a first case 30 and a second case 40 that are assembled to each other. The first case 30 and the second case 40 are formed into U-shapes that oppose to each other by a press-forming.

The first case 30 has a bottom plate portion 35 that extends in the flow path width direction (the X axis direction) and in the flow path direction (the Y axis direction) and a side plate portion 33 and a side plate portion 34 that are respectively bent from both ends of the bottom plate portion 35 so as to extend in the stacked direction (the Z axis direction) and in the flow path direction (the Y axis direction). The bottom plate portion 35 has a rectangular accommodating concave portion 35A that accommodates lower portion of the fin 8. The side plate portion 33 and the side plate portion 34 face the tube end portions 9A and 9B, respectively.

The side plate portion 33 of the first case 30 has the rib 31 that projects towards the tube end portion 9A. The rib 31 is formed by bending a portion that is cut out from the central portion of the side plate portion 33. The side plate portion 33 has an opening portion 33A that opens after the rib 31 has been bent.

The rib 31 is formed to have a rectangular plate shape extending in the flow path width direction (the X axis direction) and in the stacked direction (the Z axis direction) so as to project towards the tube end portion 9A. As shown in FIG. 5, during the assembly, the rib 31 is inserted into the slits 21 of the tubes 9. With such a configuration, a tip end of the rib 31 faces the fin side-ends 8A of the stacked fins 8 in close proximity. The configuration is not limited to that described above, and it may also be possible to employ a configuration in which the tip end of the rib 31 is brought into contact with and joined to the fin side-ends 8A of the stacked fins 8.

In the first case 30, as projected portions projecting out from the inner surface 5B of the barrel body 5, two ribs 32 are formed by bending two portions that are cut out from the side plate portion 34. The side plate portion 34 has two opening portions 34A that open after the two ribs 32 have been bent.

The second case 40 has a bottom plate portion 45 that extends in the flow path width direction (the X axis direction) and in the flow path direction (the Y axis direction), and a side plate portion 43 and a side plate portion 44 that are respectively bent from both ends of the bottom plate portion 35 so as to extend in the stacked direction (the Z axis direction) and in the flow path direction (the Y axis direction). The bottom plate portion 45 has a rectangular accommodating concave portion 45A that accommodates upper portion of the fin 8.

The side plate portion 43 and the side plate portion 44 of the second case 40 are overlapped with the side plate portion 33 and the side plate portion 34 of the first case 30, respectively. The opening portion 33A of the side plate portion 33 of the first case 30 is closed by the side plate portion 43 of the second case 40. The opening portions 34A of the side plate portion 34 of the first case 30 are closed by the side plate portion 44 of the second case 40.

The two ribs 32 are formed so as to have a rectangular plate shape extending in the flow path width direction (the X axis direction) and in the stacked direction (the Z axis direction). As shown in FIG. 5, during the assembly, the two ribs 32 are inserted into the slits 22 of the tubes 9. With such a configuration, tip ends of the respective two ribs 32 face the fin side-ends 8B of the stacked fins 8 in close proximity. The configuration is not limited to that described above, and it may also be possible to employ a configuration in which the tip ends of the two ribs 32 are brought into contact with and joined to the fin side-ends 8B of the stacked fins 8.

As shown in FIGS. 3 to 6, pairs of (four) protruded portions 36A are formed at front and back parts of the first case 30. The protruded portions 36A are respectively formed at a front end and a back ends of portions where the side plate portion 33 and the side plate portion 34 are bent.

In the second case 40, pairs of (four) cut-out portions 46A are respectively formed so as to open at front and back parts of tip-corner portions of the side plate portion 43 and the side plate portion 44. The cut-out portions 46A are respectively formed so as to avoid the protruded portions 36A of the first case 30 in a state in which the first case 30 and the second case 40 are assembled.

The side plate portion 43 and the side plate portion 44 of the second case 40 are overlapped with the side plate portion 33 and the side plate portion 34 of the first case 30 so as to avoid vertex portions 5C of the barrel body 5 by fitting the cut-out portions 46A to the protruded portions 36A of the first case 30.

Figure 8:
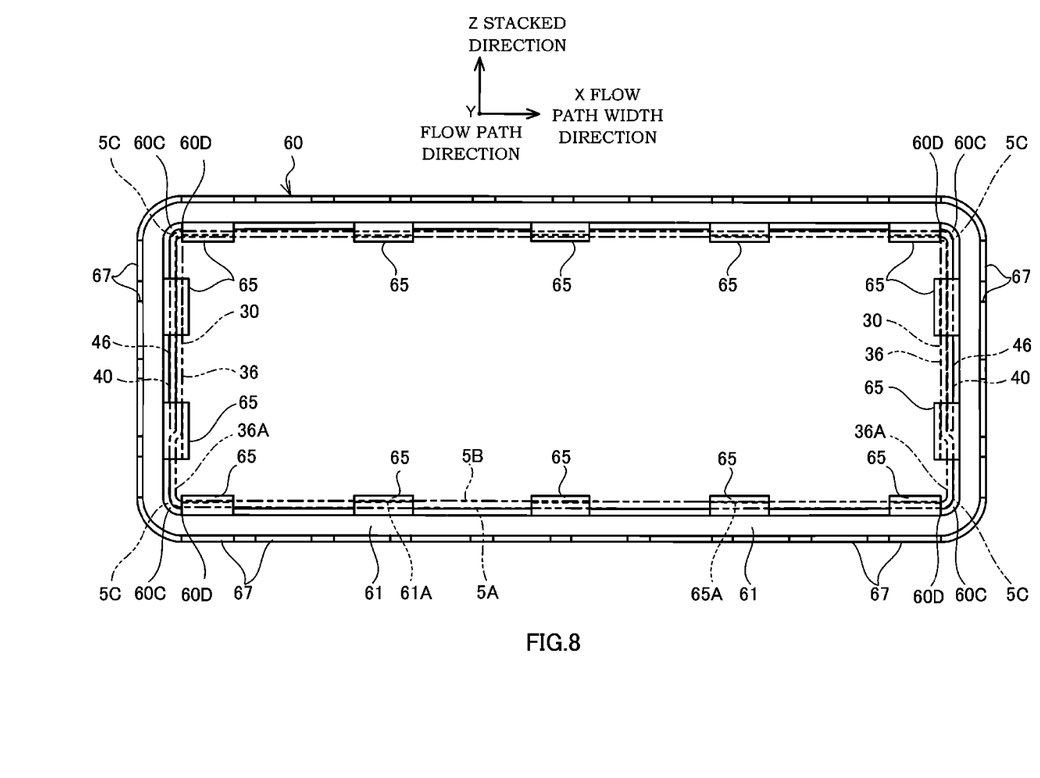
FIG. 8 is a front view showing a frame body.

As shown in FIG. 8, the barrel body 5 has four vertex portions 5C on a front opening end portion. Upper two vertex portions 5C in FIG. 8 are formed by the second case 40. Lower two vertex portions 5C in FIG. 8 are formed by the protruded portions 36A of the first case 30. The barrel body 5 has the vertex portions 5C on a back opening end portion in similar manner.

As shown in FIG. 2, a pair of frame bodies 60 are fitted into the front and back opening end portions of the barrel body 5 formed by the first case 30 and the second case 40.

As shown in FIG. 8, the frame body 60 has a frame part 61 having a substantially rectangular ring shape. The frame part 61 has a ring-shaped fitting surface 61A on its inner circumference. The fitting surface 61A is fitted into an outer surface 5A of the barrel body 5.

Figure 7:
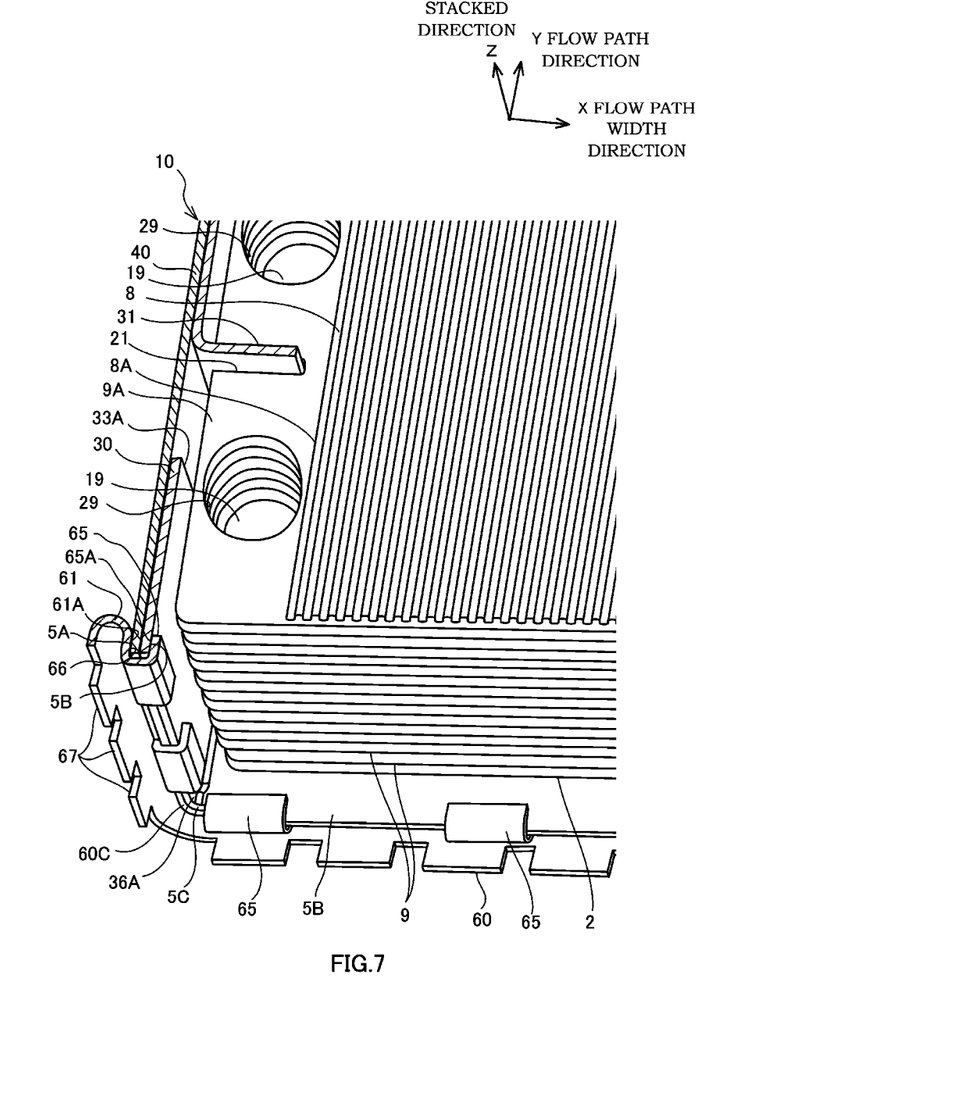
FIG. 7 is a perspective view showing the assembled body.

As shown in FIG. 7, the frame part 61 has a U-shaped cross-sectional shape and is formed with, on its inner side, a ring-shaped accommodating concave portion 66 to which the ducts 6 and 7 are assembled.

The frame body 60 has a plurality of (fourteen) inner engagement portions 65 that project out from an inner circumferential end of the frame part 61 so as to form a hook shape. The inner engagement portions 65 are provided by being extended from the frame part 61 so as to have a U-shaped cross-sectional shape. The inner engagement portions 65 each has an engaging surface 65A that opposes to the fitting surface 61A with a gap therebetween. The engaging surfaces 65A engage with the inner surface 5B of the barrel body 5.

As shown in FIG. 8, between two pairs of the inner engagement portions 65 arranged along the stacked direction (the Z axis direction) and the frame part 61, the first case 30 and the second case 40 are held.

Lower inner engagement portions 65 of the two pairs of the inner engagement portions 65 arranged along the stacked direction (the Z axis direction) are provided such that parts of the engaging surfaces 65A face the protruded portions 36A of the first case 30, thereby pushing the vertex portions 5C of the barrel body 5 formed by the protruded portions 36A against vertex portions 60C of the frame bodies 60.

Between five inner engagement portions 65 arranged along the flow path width direction (the X axis direction) shown in an upper part in FIG. 8 and the frame part 61, only the second case 40 is held.

Between five inner engagement portions 65 arranged along the flow path width direction (the X axis direction) in a lower part in FIG. 8 and the frame part 61, only the first case 30 is held.

The inner engagement portions 65 provided on both ends in the flow path width direction (the X axis direction) engage with parts close to the vertex portions 60C of the frame bodies 60. Specifically, in FIG. 8 seen from the flow path direction (the Y axis direction), the frame body 60 has the vertex portions 60C that are curved so as to face the vertex portions 5C of the barrel body 5 and vertex-connected portions 60D that are continuous with the vertex portions 60C such that the inner surface 5B extends in a straight line. The inner engagement portions 65 project out from the vertex-connected portions 60D and engage with parts close to the vertex portions 5C of the barrel body 5, thereby pushing the vertex portions 5C of the barrel body 5 against the vertex portions 60C of the frame bodies 60.

The frame body 60 has a plurality of outer engagement portions 67 that project out from an outer circumferential end of the frame part 61 so as to form a claw shape. As shown in FIG. 1, the outer engagement portions 67 project out so as to face outer surfaces of the ducts 6 and 7 received in the accommodating concave portion 66 of the frame part 61, and the outer engagement portions 67 are arranged so as to have predetermined gaps therebetween. As described below, the outer engagement portions 67 are bent so as to connect the ducts 6 and 7 assembled to the frame part 61 by caulking.

Members, such as the tube sheet 20, the fins 8, the first case 30, the second case 40, the pipe plate 18, and the frame bodies 60, are each formed by press-forming metal plates made of, for example, aluminum etc. As the respective members, clad materials on joining surfaces of which filler materials and flux are applied are used.

When the heat exchanger 1 is fabricated, an assembling step of assembling the pipes 3 and 4, the tube sheet 20, the fins 8, the first case 30, the second case 40, the pipe plate 18, and the frame bodies 60 into an assembled body 10 (see FIG. 7), and a joining step of brazing the respective members by transferring the assembled body 10 into a heating furnace (not shown).

In the assembling step, the assembled body 10 is assembled according to the following procedure.

First of all, the tube sheet 20 and the fins 8 are stacked and accommodated in the first case 30.

Next, the second case 40 is overlapped with and assembled to the first case 30.

Next, the front and back frame bodies 60 are fitted into and assembled to the first case 30 and the second case 40.

Next, the inner engagement portions 65 are bent such that the second case 40 and the first case 30 are held between the inner engagement portions 65 and the frame part 61.

The pipes 3 and 4 are assembled to the barrel body 5 via the pipe plate 18.

In the assembling step, the configuration is not limited to that described above, and the operation of bending the inner engagement portions 65 may not be performed. In this case, a configuration in which, when the frame bodies 60 are fitted into the first case 30 and the second case 40, the first case 30 and the second case 40 are forcedly fitted into the gap between the frame part 61 and the inner engagement portions 65 is employed.

With the assembled body 10 thus assembled, the stacked tube sheet 20, the fins 8, the first case 30, and the second case 40 are bound by the front and back frame bodies 60. With such a configuration, the tube sheet 20 and the fins 8 forming the core 2 are held in a stacked state with no gaps. Therefore, in the assembled body 10, the assembled state of the respective members is maintained without using binding means, such as band or jig, for binding the respective members.

The configuration is not limited to that described above, and it may also be possible to employ a configuration in which the respective members of the assembled body 10 are held by using a band (binding means), jig, or the like.

In the joining step, the assembled body 10 is transferred into the heating furnace and a heating process is performed. By doing so, the brazing of the assembled body 10 in which the respective members are joined with the molten filler material is performed.

The ducts 6 and 7 are connected to the assembled body 10 the respective members of which are joined through the joining step. Opening ends of the ducts 6 and 7 are fitted to the frame parts 61 of the frame bodies 60, respectively, and each of the outer engagement portions 67 is bent so as to connect the ducts 6 and 7 by caulking.

Next, advantages of this embodiment will be described.

According to this embodiment, the flow-path structure through which the intake air (fluid) flows includes: the barrel body 5 through which the intake air flows in an inner circumference; and the frame bodies 60 configured to connect the ducts 6 and 7 (flow path members) for guiding the intake air into the barrel body 5. The frame bodies 60 each has the ring-shaped frame part 61 configured to be fitted into and joined to the outer surface 5A of the barrel body 5; and the inner engagement portions 65 configured to engage with the inner surface 5B of the barrel body 5 so as to hold a state in which the outer surface 5A of the barrel body 5 is brought into contact with the frame part 61.

According to the above-mentioned configuration, the ring-shaped frame parts 61 of the frame bodies 60 are fitted to the outer surface 5A of the barrel body 5, and thereby, deformation of the barrel body 5 towards outside is restricted during the joining step. The inner engagement portions 65 engage with the inner surface 5B of the barrel body 5, and thereby, separation of the barrel body 5 from the frame parts 61 is restricted during the joining step. With such a configuration, the frame parts 61 and the outer surface 5A of the barrel body 5 can be assembled and joined without forming a gap, and therefore, it is possible to prevent occurrence of an assembling (joining) error of the flow-path structure.

In addition, the barrel body 5 includes the first case 30 and the second case 40 configured to be assembled to a barrel-shape by being overlapped to each other. The frame bodies 60 is configured to hold overlapped parts between the frame part 61 and the inner engagement portions 65, the overlapped parts being parts where the first case 30 and the second case 40 are overlapped to each other.

According to the above-mentioned configuration, the parts of the first case 30 and the second case 40 that are overlapped to each other are held between the frame part 61 and the inner engagement portions 65, and thereby, separation of the parts from each other is restricted. With such a configuration, the frame part 61, the first case 30, and the second case 40 can be joined with the filler material without forming a gap.

In addition, the barrel body 5 has the vertex portions 5C, the outer surface 5A of the barrel body 5 being curved at the vertex portions 5C. The frame bodies 60 each has the vertex portions 60C at which the frame parts 61 are curved along the vertex portions 5C of the barrel body 5. The inner engagement portions 65 engage with the inner surface 5B (the vertex-connected portions 60D) that is continuous with the vertex portions 60C of the frame part 61.

According to the above-mentioned configuration, with the frame bodies 60, the vertex-connected portions 60D are pushed against the vertex portions 5C by the inner engagement portions 65 at positions close to the vertex portions 5C of the barrel body 5, and thereby, the separation of the vertex portions 5C of the barrel body 5 from the vertex portions 60C of the frame bodies 60 is effectively suppressed, and the frame bodies 60 and the barrel body 5 are joined with the filler material without forming a gap.

In addition, this embodiment employs a configuration in which the barrel body 5 is provided with the tubes 9 through which the coolant liquid (fluid) flows, and the heat exchange is performed between the coolant liquid flowing through an inside of the tubes 9 and the intake air (fluid) flowing through an outside of the tubes 9.

According to the above-mentioned configuration, it is possible to provide the heat exchanger 1 capable of performing the heat exchange between the coolant liquid flowing through the inside of the tubes 9 and the intake air flowing through the outside of the tubes 9.

In addition, a plurality of the tubes 9 are stacked. The barrel body 5 includes the first case 30 and the second case 40 configured to be joined so as to hold the tubes 9, the tubes 9 being held between the first case 30 and the second case 40 in the stacked direction (the Z axis direction). This embodiment employs a configuration in which the frame bodies 60 is fitted over the first case 30 and the second case 40.

According to the above-mentioned configuration, the plurality of the tubes 9 are stacked and held between the first case 30 and the second case 40 by the frame bodies 60, and thereby, the assembled body 10 is provided. In the assembled body 10, the first case 30, the plurality of the tubes 9, and the second case 40 are joined integrally in a state in which the respective members are bound by the frame bodies 60. With such a configuration, it is possible to achieve the joining without using tieing means for binding the assembled body 10, such as a band, jig, or the like.

In addition, the tubes 9 each has the tube end portions 9A and 9B that extend in the flow path direction of the intake air along the inner surface 5B of the barrel body 5 and the slits 21 and 22 (recessed portions) that open at the tube end portions 9A and 9B, respectively. The barrel body 5 has the ribs 31 and 32 (projected portions) that project out from the inner surface 5B of the barrel body 5 and that are inserted into the slits 21 and 22 opening at the tube end portions 9A and 9B.

According to the above-mentioned configuration, when the heat exchanger 1 is operated, the intake air flowing through an inside of the barrel body 5 is subjected to the heat exchange with the coolant liquid flowing through the inside of the tubes 9 via the tube heat transfer portions 9C by flowing along the tube heat transfer portions 9C. The intake air flowing along the inner surface 5B of the barrel body 5 is guided to the direction towards the tube heat transfer portions 9C from the tube end portions 9A and 9B by hitting the ribs 31 and 32 that are inserted into the slits 21 and 22 of the tube end portions 9A and 9B. As described above, with the heat exchanger 1, because the intake air is guided so as to flow along the tube heat transfer portions 9C via the ribs 31 and 32, the heat exchange between the intake air and the coolant liquid is promoted, and it is possible to improve an efficiency of the heat exchange in the heat exchanger 1.

In addition, the barrel body 5 includes the first case 30 and the second case 40. The first case 30 has the opening portions 33A and 34A opening at portions where the ribs 31 and 32 have been bent, and the second case 40 closes the opening portions 33A and 34A by being overlapped on the first case 30.

According to the above-mentioned configuration, in the heat exchanger 1, the intake air is prevented from flowing out to the outside through the opening portions 33A and 34A. At the same time, with the heat exchanger 1, because the second case 40 is integrally formed with portions for closing the opening portions 33A and 34A, it is possible to avoid increase in the number of parts.

Furthermore, with the barrel body 5, because the second case 40 is overlapped with and joined to the first case 30 from which the ribs 31 and 32 are projected, it is possible to increase a pressure resistance.

In addition, the first case 30 has the protruded portions 36A that protrude so as to face the vertex portions 60C of the frame bodies 60. A configuration in which the second case 40 has the cut-out portions 46A that open so as to avoid the protruded portions 36A is employed.

According to the above-mentioned configuration, with the barrel body 5, because tip ends of the second case 40 are separated from the vertex portions 60C of the frame bodies 60, it is possible to avoid formation of a gap between the vertex portions 5C of the barrel body 5 and the vertex portions 60C of the frame bodies 60 due to the plate thickness of the second case 40. With such a configuration, it is possible to allow the second case 40 to overlap with the first case 30 over a wide area so as to close the opening portions 33A and 34A of the first case 30.

The configuration of the barrel body 5 is not limited to that in which the first case 30 and the second case 40 are overlapped to each other. For example, the barrel body 5 may have a configuration in which tip ends of the first case 30 and tip ends of the second case 40 are abutted and joined to each other.

In addition, the frame bodies 60 have the plurality of the outer engagement portions 67 that protrude from the frame part 61 and engage with the ducts 6 and 7 (flow path members). The frame part 61 has the accommodating concave portion 66 that accommodates opening end portions of the ducts 6 and 7. The inner engagement portions 65 and the outer engagement portions 67 project out from the frame part 61 such that the accommodating concave portion 66 is held between them.

In addition, the barrel body 5 accommodates the core 2 as the treating means for cooling the intake air. The core 2 has a configuration in which the intake air to be sucked into the engine flows through the outside of the tubes 9 via the barrel body 5, and the coolant liquid for cooling the intake air flows through the inside of the tubes 9.

According to the above-mentioned configuration, the flow-path structure is used as the fluid-cooled charge air cooler for cooling the intake air of the engine.

Although the embodiment of the present invention has been described in the above, the above-mentioned embodiment merely illustrates a part of application examples of the present invention, and the technical scope of the present invention is not intended to be limited to the specific configurations in the above-mentioned embodiment.

Although the flow-path structure according to the embodiment of the present invention is suitable for the charge air cooler mounted on a vehicle, there is no limitation thereto, and the embodiment of the present invention may also be applied to the flow-path structure of a catalytic converter, a exhaust muffler, or the like mounted on the vehicle. In addition, the present invention may also be applied to the flow-path structure for non vehicle-use.

This application claims priority based on Japanese Patent Application No. 2016-058863 filed with the Japan Patent Office on Mar. 23, 2016, the entire contents of which are incorporated into this specification.

The invention claimed is:

1. A flow-path structure through which fluid flows, the flow-path structure comprising:
   a barrel body through which fluid flows in an inner circumference; and
   a frame body configured to connect a flow path member, the flow path member being configured to guide the fluid into the barrel body, wherein
   the frame body has:
   a ring-shaped frame part configured to be fitted into an outer surface of the barrel body; and
   an inner engagement portion configured to engage with an inner surface of the barrel body so as to hold a state in which the outer surface of the barrel body is brought into contact with the frame part,
   the barrel body comprises a first case and a second case configured to be assembled to a barrel-shape by being overlapped to each other,
   the frame body is configured to hold an overlapped part between the frame part and the inner engagement portion, the overlapped part being a part where the first case and the second case are overlapped to each other,
   the first case is formed into a U-shape and includes a first bottom plate portion and first side plate portions, the first side plate portions being respectively bent from both ends of the first bottom plate portion,
   the second case is formed into a U-shape and includes a second bottom plate portion and second side plate portions, the second side plate portions being respectively bent from both ends of the second bottom plate portion,
   the barrel body is formed into the barrel-shape by the first side plate portions and the second side plate portions being respectively overlapped,
   the first side plate portions having ribs that allow positioning of tubes with respect to the barrel body, the ribs are formed by bending a portion that is cut out from central portions of the first side plate portions, the first case has opening portions that open after the ribs have been bent, and the second case overlaps with the first case and closes the opening portions.

2. The flow-path structure according to claim 1, wherein the tubes comprise a plurality of tubes which are stacked, the barrel body is provided with at least one tube of the plurality of tubes through which fluid flows, and heat exchange is performed between the fluid flowing through an inside of the at least one tube and the fluid flowing through an outside of the at least one tube, the barrel body comprises the first case and the second case configured to hold the plurality of tubes in a stacked direction, and the first side plate portions and the second side plate portions extend in the stacked direction.

3. The flow-path structure according to claim 2, wherein intake air to be sucked into an engine flows through the outside of the at least one tube via the barrel body and coolant liquid cooling the intake air flows through the inside of the at least one tube.

* * * * *